(12) United States Patent
Boudrie et al.

(10) Patent No.: US 7,266,574 B1
(45) Date of Patent: Sep. 4, 2007

(54) IDENTIFICATION OF UPDATED FILES FOR INCREMENTAL BACKUP

(75) Inventors: Robert A Boudrie, Ashland, MA (US); David C Dysert, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 436 days.

(21) Appl. No.: 10/032,075

(22) Filed: Dec. 31, 2001

(51) Int. Cl.
*G06F 17/30* (2006.01)

(52) U.S. Cl. .................................... 707/204
(58) Field of Classification Search ............... 707/204, 707/206, 205, 200, 24, 201
See application file for complete search history.

(56) References Cited

U.S. PATENT DOCUMENTS

| | | | |
|---|---|---|---|
| 5,045,996 A * | 9/1991 | Barth et al. ................. | 711/143 |
| 5,455,946 A * | 10/1995 | Mohan et al. ............... | 707/202 |
| 5,720,026 A * | 2/1998 | Uemura et al. ................ | 714/6 |
| 5,761,677 A * | 6/1998 | Senator et al. .............. | 707/203 |
| 6,023,710 A * | 2/2000 | Steiner et al. .............. | 707/204 |
| 6,038,665 A * | 3/2000 | Bolt et al. .................. | 713/176 |
| 6,397,229 B1 * | 5/2002 | Menon et al. .............. | 707/204 |
| 6,460,054 B1 * | 10/2002 | Grummon ................... | 707/204 |
| 6,487,644 B1 * | 11/2002 | Huebsch et al. ............ | 711/162 |
| 6,490,597 B1 * | 12/2002 | Singh et al. ................ | 707/204 |
| 6,643,671 B2 * | 11/2003 | Milillo et al. ............... | 707/204 |
| 6,647,399 B2 * | 11/2003 | Zaremba ..................... | 707/204 |
| 6,714,952 B2 * | 3/2004 | Dunham et al. ............ | 707/204 |

OTHER PUBLICATIONS

Levy et al., Incremental Recovery in Main Memory Database Systems, IEEE Transactions on Knowledge and Data Engineering, vol. 4, No. 6, Dec. 1992, pp. 529-540.*

* cited by examiner

*Primary Examiner*—Greta Robinson
(74) *Attorney, Agent, or Firm*—Daly, Crowley, Mofford & Durkee, LLP

(57) ABSTRACT

A method may be provided for incrementally backing up data from a logically represented volume on disk media. The disk media is accessible by a client through a network connection. The client comprises an enterprise database application. The method identifies tracks of the logically represented volume that have changed since a last incremental backup operation by reading fresh data indications. Each of the fresh data indications corresponds to a track of the logically represented volume, and a given fresh data indication is indicative of whether its corresponding track has been changed since a last incremental backup operation. Files are identified for incremental backup. The identified files comprise blocks saved on a track deemed changed since a last incremental backup operation. The identified files are backed up from the disk media to sequential storage media through a high speed connection.

13 Claims, 5 Drawing Sheets

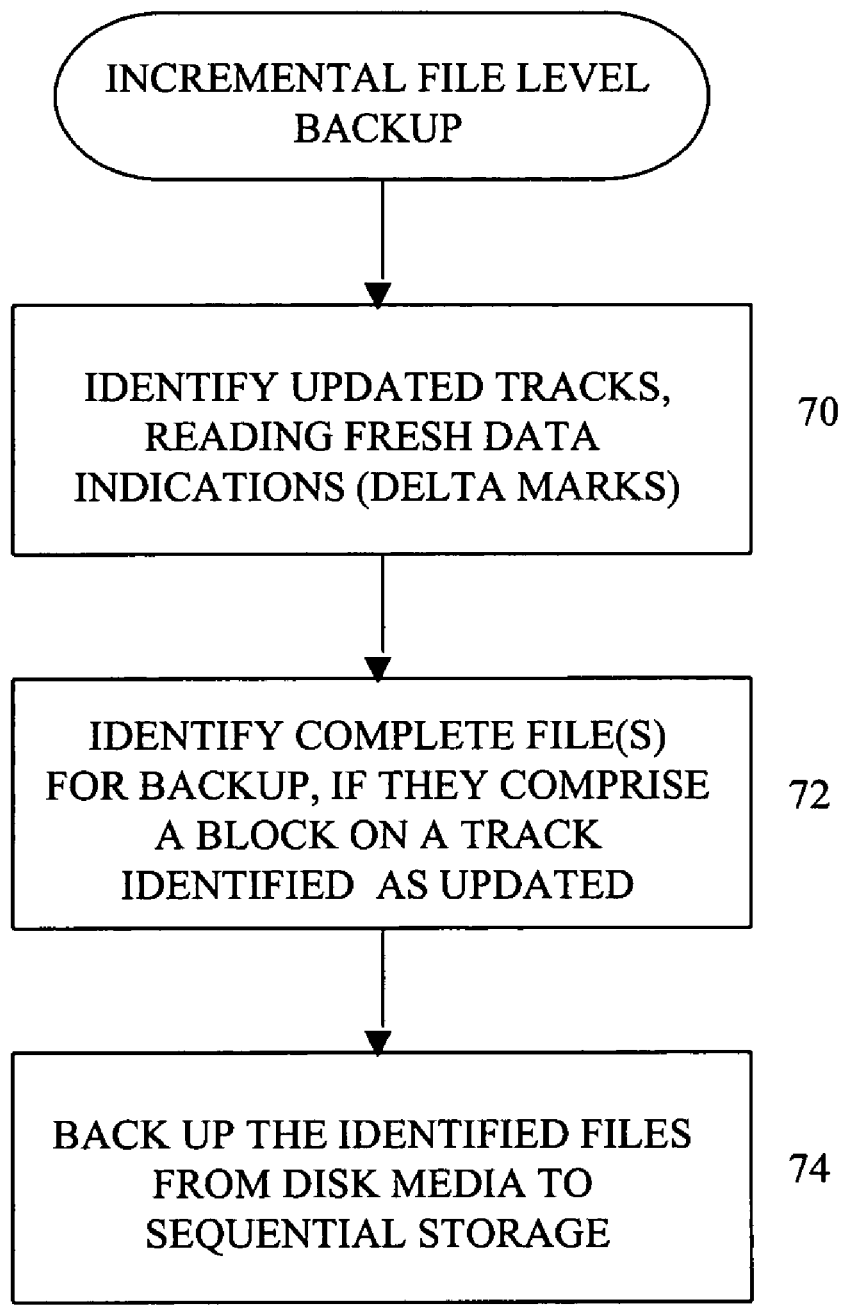

IDENTIFICATION OF UPDATED FILES FOR INCREMENTAL BACKUP

BACKGROUND OF THE INVENTION

1. Copyright Notice

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

2. Field of the Invention

The present invention, in certain respects, relates to storage systems and backup and recovery processes. In other respects, the present invention relates to certain techniques for improving performance and speed of data backup and recovery processes. In other respects, the present invention relates to such systems, processes, and techniques in enterprise storage systems.

3. Description of Background Information

Enterprise storage systems provide enterprise level computer systems and networks with a readily accessible, safe storage media for their mission-critical data. An internet service provider's (ISP's) computer infrastructure and the human resources and accounting systems for a large enterprise are a few examples of enterprise level systems. To protect the data, such enterprise storage systems replicate data on a primary disk (or volume) with one or more mirror disks (or volumes). Additionally, data on the primary disk—to which the enterprise application has direct and immediate read and write access—is periodically and/or intermittently backed up to sequential storage media (e.g., tapes). If data on the primary (and mirrors) is lost or corrupted, or otherwise reproduced, it can be recovered from the sequential storage.

It is important that such backup and recovery processes are executed quickly (with minimal latency) and without any disruptive or otherwise undesired use of overhead and system resources of the computers involved (e.g., the client system, the network, and the data manager of the enterprise storage system).

Enterprise storage systems such as those described above perform data backup processes and restore processes. Disk level backups and restores (otherwise referred to as physical backups and restores) involve the backing up or the restoring of a raw "image" of the entire disk (as seen from the perspective of the client—e.g., a client's operating system may identify a given disk logically as a host device). File-level backups and restores (otherwise referred to as logical backups and restores) require file mapping, a process by which each file to be backed up, that may be located at various physical locations on a disk (or separate disks) is mapped (i.e., tracked using meta data) when it is sent to the backup storage devices.

Device backups involve backing up all data of a given device; e.g., the device may be defined as the primary disk, which is replicated in the mirror disk. A restore of a device backup must restore the entire device, since file-level information is not tracked during a device backup. Raw file system backups also involve backing up the entire device, and restores of such a backup require restoring of the entire device. However, a raw file system backup is different from a device backup in that a user can browse for a certain file using a restore GUI; with a device backup such browsing is not possible. File level backups backup files as files, i.e., with file level granularity.

Device level backups and raw file system backups are faster than file level backups, and thus can be easier on the user system and its database application, i.e., the require less processing involvement by the user system. In contrast, file level backups can require substantial participation by applications and operating systems on the user system, and thereby reduce the performance of the user system. When a file level backup is performed, the user system must keep track of components of data files typically scattered and stored in non-contiguous segments spanning different disks within the storage system.

It is sometimes desirable to perform incremental backups of individual files, which have been updated since a last backup operation. Such can be done using file level backups; however, conventional file level backups require substantial system overhead and can slow a client system's access to the enterprise storage.

Incremental backups may be done by simply backing up files that have a modified time stamp later than the time of the last backup operation. Such an approach is shown in the flow chart of FIG. 3. In act 50, software within the data manager of an enterprise storage platform checks, for each file, its time stamp. In act 52, for files with time stamps after the time of the last backup operation, the entire file is included in the current backup operation.

A time stamp approach can entail backing up of files unnecessarily due false indications that the file's modification time has changed since the last backup. For example, an operator may have intentionally set the modified date/time stamp. On the other hand, if a file is moved—an action that would create a need to backup the file at its new logical location—it's modification date/time may not change.

Incremental backups may also be done using a change mark hardware mechanism provided in an enterprise storage platform. Each track of a volume (represented as such logically by the enterprise storage platform and/or by a client that stores data using such a platform) has a corresponding flag bit (called a change mark). By way of example, a change mark as referred to herein may be a "deltamark" as used in the EMC Symmetrix™ system. These change marks are populated as follows: Every time there is a change to a block on a given track, the track's corresponding change mark bit is changed to "1." When an incremental backup is performed on a given track, its corresponding change mark bit is changed to "0." Incremental backups are performed on a track by track basis; i.e., those tracks having a change mark of "1" get backed up during the incremental backup operation.

The change mark approach can spread backed up files across separate tapes, since a given file will typically be on several different tracks, and some portions of the file (on some tracks) may have been updated since the last backup, while other portions (on other tracks) may not have been updated since the last backup.

SUMMARY OF THE INVENTION

The present invention is presented to serve one or more of the objects and advantages as set forth herein. In certain respects, the present invention is directed to improved identification of updated files for incremental backup of such files. A method is presented for improving the performance of the backup and recovery processes.

In accordance with one aspect of the invention, an enterprise storage system is provided. Alternatively, the invention may be directed to a method, or any part or portion of the system or method. The invention may also be embodied in the form of computer-readable media encoded to perform all or any subset of the functions of such a system or method.

A method may be provided for incrementally backing up data from a logically represented volume on disk media. The disk media is accessible by a client through a network connection. The client comprises an enterprise database application. The method identifies tracks of the logically represented volume that have changed since a last incremental backup operation by reading fresh data indications. Each of the fresh data indications corresponds to a track of the logically represented volume, and a given fresh data indication is indicative of whether its corresponding track has been changed since a last incremental backup operation. Files are identified for incremental backup. The identified files comprise blocks saved on a track deemed changed since a last incremental backup operation. The identified files are backed up from the disk a media to sequential storage media through a high speed connection.

BRIEF DESCRIPTION OF THE DRAWINGS

Non-limiting embodiments of the present invention are described in the detailed description below, by reference to the noted drawings, in which like reference numerals represent similar parts throughout the several views of the drawings, and wherein:

FIG. 5 is a flow chart of an example embodiment of a process for performing an incremental file level backup operation.

DETAILED DESCRIPTION

Figure 1:
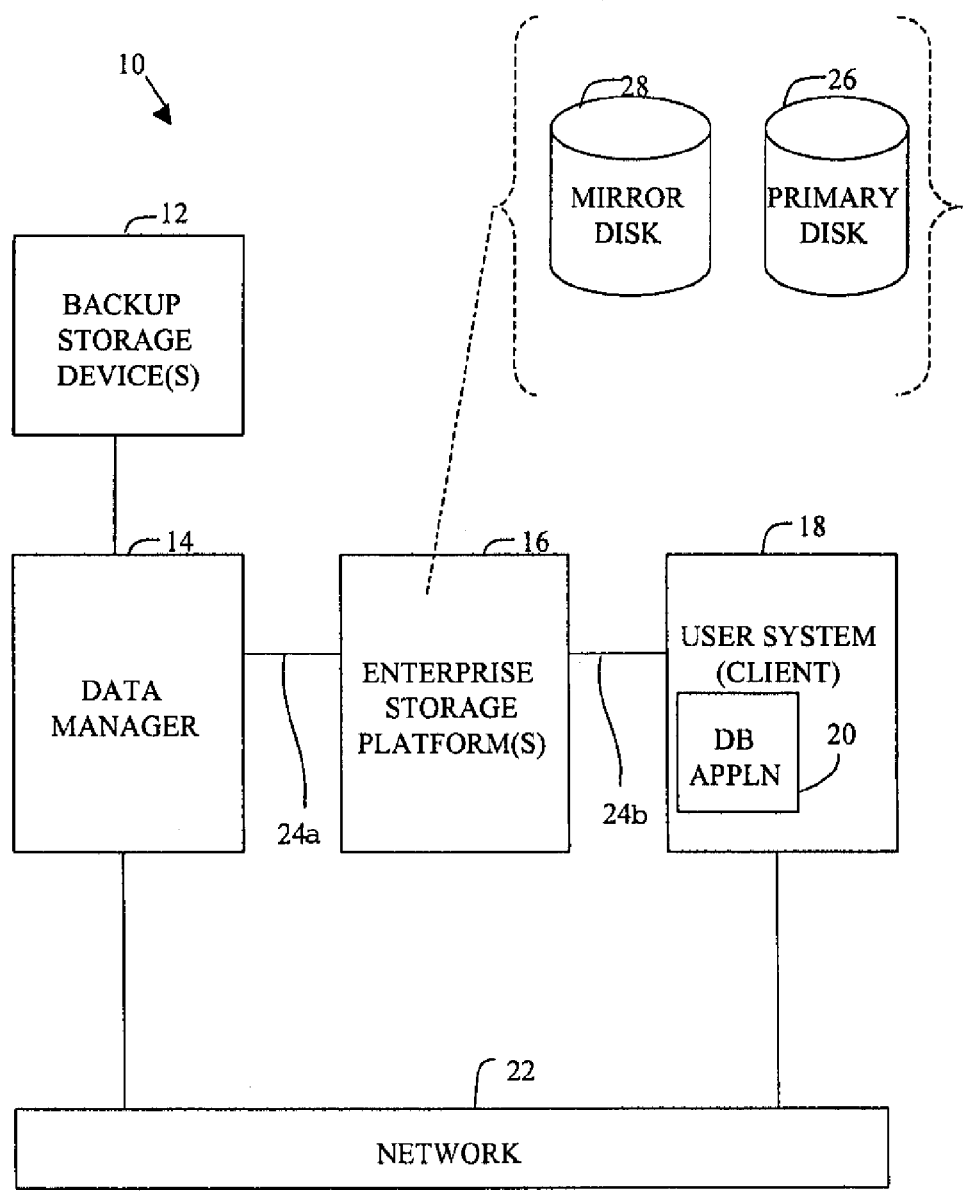
FIG. 1 is a simplified high-level block diagram of an illustrated embodiment of an enterprise storage system capable of performing backups and restores.

Referring now to the drawings in more detail, FIG. 1 illustrates one embodiment of an enterprise storage system 10 involved in backing up data from a primary disk 26 to one or more backup storage devices 12. In the illustrated system, a backup storage device (or plural backup storage devices) 12 is connected to a data manager 14. Data manager 14 is connected, in tandem, to an enterprise storage platform (or plural collocated or remote enterprise storage platforms) 16 and to a user system (a host system; otherwise referred to as a client) 18. In the illustrated system, each of data manager 14 and user system 18 is linked via a network 22, and is connected directly to at least one local enterprise storage platform 16 via one or more channels (e.g., SCSI channels) 24a,b.

Backup storage device(s) 12 may comprise, e.g., a tape library unit. Data manager 14 may comprise, e.g., a Sun™ microstation running EDM™ software (EMC data manager software). Enterprise storage platform 16 may, e.g., comprise one or more plural local/collocated or remote Symmetrix™ integrated cached disk arrays™ (a remote disk array may be a Symmetrix Remote Data Facility (SRDF)). User system 18 may comprise a host computer or a host computer network, which includes a database application.

Database application 20 retrieves and stores, in real time, data from and to a primary disk 26. The data on primary disk 26 may be mirrored by a mirror disk 28. Mirror disk 28 may comprise one or a combination of a RAID type of mirror and a mirror—such as a Business Continuance Volume (BCV). In the illustrated embodiment, mirror disk 28 comprises a volume which may be protected via a RAID mirror.

In operation, a database application 20 in one or more user systems 18 accesses, processes, and stores data in or on enterprise storage platform 16. User system 18 is interfaced to the enterprise storage platform, which is in turn coupled to a data manager, which controls, among other functions, backup operations where data on a primary disk 26 is backed up to one or more backup storage devices 12. Generally, a data manager may be capable of performing several different types of backup operations, including, e.g., a device backup, a raw file system backup, and a file-level backup. If the backup is a mirrored backup, the data is copied from the mirror disk to the backup storage device, while the user system keeps access to the primary disk. If the backup is not a mirrored backup, the data is copied directly from the primary disk to the backup storage device.

Device backups involve backing up all data of a given device; e.g., the device may be defined as the primary disk, which is replicated in the mirror disk. A restore of a device backup must restore the entire device, since file-level information is not tracked during a device backup. Raw file system backups involve backing up an image of the portion of a disk on which a file system is stored (File systems can in some cases occupy part of a disk, or potentially span multiple disks—a "file system" backup is a backup of the image of the entire file system), and restores of such a backup has traditionally required restoring of the entire device. A raw file system backup includes only the portions of the disk(s) used for a particular file system, whereas device level backup backs up entire logical devices. File level backups backup files as files, i.e., with file level granularity.

Device level backups and raw file system backups are faster than file level backups, and thus can be easier on the user system and its database application, i.e., the require less processing involvement by the user system. In contrast, file level backups can require substantial participation by applications and operating systems on the user system, and thereby reduce the performance of the user system. When a file level backup is performed, the user system must keep track of components of data files typically scattered and stored in non-contiguous segments spanning different disks within the storage system.

Figure 2:
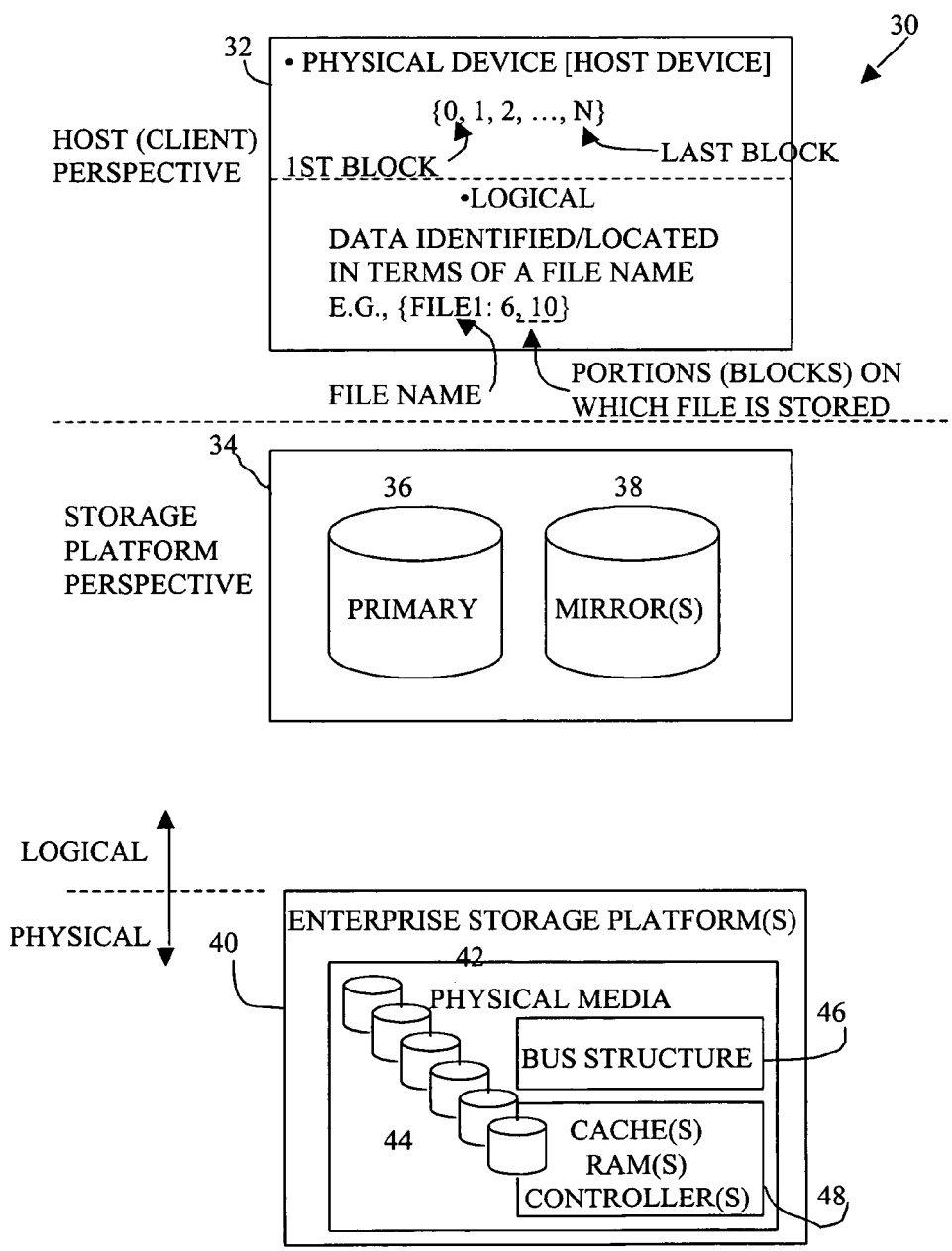
FIG. 2 is a diagram that shows the relationship among different data structure representation schemes in an enterprise storage system.

FIG. 2 is a block diagram that presents some of the data structure nomenclature for a disk-oriented enterprise storage system 30. At the physical level, a given enterprise storage platform 40 (e.g., a Symmetrix system) may have a physical media portion 42, that comprises physical hard disks 44, a bus structure 46, and other devices, including one or more caches, RAM, and one or more controllers 48.

Data stored in the physical media portion 42 may be stored on an actual hard disk 44 or in a cache or RAM. Regardless of where data is at a given time within physical media portion 42 of enterprise storage platform 40, it's location at another (logical) level, i.e., from the perspective of the storage platform 34, may be in terms of a primary disk (or volume) 36 and one or more mirror disks (or volumes) 38. From the perspective of the client (or host) 32, data may be stored anywhere within a storage entity called (in terms used by the client) a physical device. Such a storage entity may also be called, e.g., a host device or a physical volume.

At the physical device level, the client will represent data in terms of its being located within given blocks sequentially ordered from the beginning of the physical device (at block 0) until the end of the physical device (at block N).

From the perspective of the client (or host), the stored data may be tracked in terms of individual files and blocks forming such files. Such a representation is referred to as a logical level representation. With such a representation, data is identified and located in terms of its file name. For example, a file called "file1" may comprise blocks located at block numbers 6 and 10 in terms of the physical device. Accordingly, with a logical file level representation, such a file is represented as {file1: 6, 10}.

Figure 4:
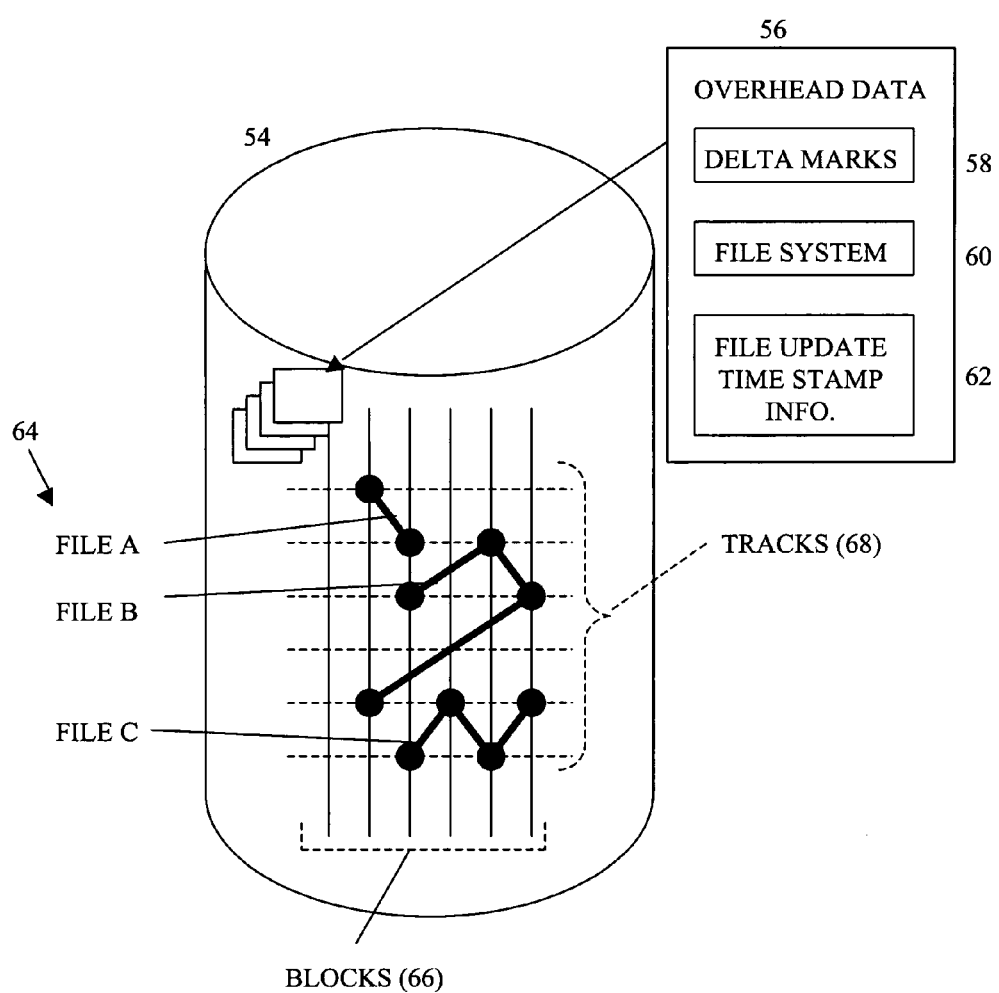
FIG. 4 is a schematic diagram of a logical volume within an enterprise storage platform in accordance with the illustrated embodiment.

FIG. 4 is a schematic diagram of a disk or volume, defined in terms of the client's file system—i.e., in terms of the logical level representation shown near the top of FIG. 2. A logical volume (which may correspond to one or both of a primary disk and a mirror disk of an enterprise storage platform) 54 is illustrated. Its data is organized into tracks 68, and each track has a number of block locations for storing respective blocks 66.

FIG. 4 shows, in simplified terms, symbolic representations of blocks of files (FILE A, FILE B, and FILE C); each such block is represented by a dot located at the block and track at which it is stored (from the logical perspective of the enterprise storage platform). A given file (e.g., FILE A) is schematically represented as a set of blocks (FILE A has two blocks, represented by dots) connected by a thick line.

Overhead data 56 is also stored in the physical media (persisted on disk media, in the illustrated embodiment) corresponding to the illustrated logical volume 54. The overhead data comprises, among other types of data (not specifically shown), change marks 58, file system data 60, and file update time stamp information 62. Change marks 58 may not be stored on the disk in a manner like file system data 60, and file update time stamp information 62. Rather, change marks 58 may be stored within data structures provided within an enterprise storage platform (e.g., a Symmetrix™). Such change marks, stored within data structures provided in the enterprise storage platform, may be accessed by making calls to the enterprise storage platform.

FIG. 5 is a flow chart of a process for incrementally backing up data from a logically represented volume on disk media, accessible by a client through a network connection. The client may be a user system 18 as shown in FIG. 1, which comprises an enterprise database application 20. In a first act 70, the method identifies tracks of the logically represented volume that have changed since a last incremental backup operation by reading fresh data indications. The fresh data indications comprise flag bits, set to zero or one, by hardware when a given track is backed up or updated, respectively. In the illustrated embodiment, the fresh data indications comprise change marks, which may be generated by a hardware mechanism (not shown) of an off-the-shelf enterprise storage platform. Change marks and the mechanisms for populating and managing the same are known in the art.

Each of the fresh data indications (change marks, in the illustrated embodiment) corresponds to a track of the logically represented volume, and a given fresh data indication is indicative of whether its corresponding track has been changed since a last incremental backup operation.

In act 72, the method identifies files for incremental backup. The identified files comprise blocks saved on a track deemed changed since a last incremental backup operation, and may also include blocks which have not changed since the previous incremental backup. In act 74, the method backs up the identified files in their entirety from the disk media to sequential storage media through a high speed connection. It is possible for a file to contain blocks which have not changed, but which reside on a track which has changed. This means that, in the illustrated embodiment, "false positives" can be encountered, and the process may backup files which have actually not changed since the previous backup. Since this type of error is always a "false positive" (i.e., including extra files for backup), rather than false negative (excluding files which should be backed up), it does not present a problem.

In the illustrated embodiment, each of acts 70, 72, and 74 is performed by data manager 14 shown in FIG. 1.

The processing performed by, e.g., the data manager, the enterprise storage platform, the user system, and the database application, may be performed by individual or shared general purpose computers or in connection with specialized processing computers. Such processing may be performed by individual platforms or by distributed processing platforms. In addition, such processing and functionality can be implemented in the form of special purpose hardware or in the form of software being run by a general purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

While the invention has been described with reference to certain illustrated embodiments, the words which have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. A method for incrementally backing up data from a logically represented volume on disk media, accessible by a client through a network connection, the client comprising an enterprise database application, said method comprising:

identifying tracks of the logically represented volume that have changed since a last incremental backup operation by reading fresh data indications, (i) wherein each of the fresh data indications corresponds to a track of the logically represented volume and (ii) wherein a given fresh data indication is indicative of whether its corresponding track has been changed since a last incremental backup operation;

identifying files for incremental backup, the identified files comprising changed and unchanged blocks saved on a track deemed changed since a last incremental backup operation; and incrementally backing up the identified files from the disk media to sequential storage media through a high speed connection.

2. The method according to claim 1, wherein the identified files are backed up in their entirety.

3. The method according to claim 2, wherein the acts of identifying tracks, identifying files, and backing up the identified files are performed by a data manager of an enterprise storage platform.

4. The method according to claim 2, wherein said fresh data indications comprise flag bits, set to zero or to one, by hardware when a given track is backed up or updated, respectively.

5. The method according to claim 4, wherein said fresh data indications comprise change marks.

6. A system for incrementally backing up data from a logically represented volume on disk media, accessible by a client through a network connection, the client comprising an enterprise database application, said system comprising:

- a track identifier to identify tracks of the logically represented volume that have changed since a last incremental backup operation by reading fresh data indications, (i) wherein each of the fresh data indications corresponds to a track of the logically represented volume and (ii) wherein a given fresh data indication is indicative of whether its corresponding track has been changed since a last incremental backup operation;
- a file identifier to identify files for incremental backup, the identified files comprising changed and unchanged blocks saved on a track deemed changed since a last incremental backup operation; and
- a backup mechanism utilizing a processor to incrementally back up the identified files from the disk media to sequential storage media through a high speed connection.

7. The system according to claim 6, wherein the track identifier, the file identifier, and the backup mechanism comprise executing portions of encoded computer-readable media of a data manager of an enterprise storage platform.

8. The method according to claim 6, wherein said fresh data indications comprise flag bits, set to zero or to one, by hardware when a given track is backed up or updated, respectively.

9. The method according to claim 8, wherein said fresh data indications comprise change marks.

10. A machine-readable media for incrementally backing up data from a logically represented volume on disk media, accessible by a client through a network connection, the client comprising an enterprise database application, the machine-readable media having stored therein computer executable instructions for:

- identifying tracks of the logically represented volume that have changed since a last incremental backup operation by reading fresh data indications, (i) wherein each of the fresh data indications corresponds to a track of the logically represented volume and (ii) wherein a given fresh data indication is indicative of whether its corresponding track has been changed since a last incremental backup operation;
- identifying files for incremental backup, the identified files comprising blocks saved on a track deemed changed since a last incremental backup operation; and
- backing up the identified files from the disk media to sequential storage media through a high speed connection.

11. The machine-readable media according to claim 10, wherein the identifying tracks, the identifying files, and the backing up comprise executing portions of encoded computer-readable media of a data manager of an enterprise storage platform.

12. The machine-readable media according to claim 10, wherein said fresh data indications comprise flag bits, set to zero or to one, by hardware when a given track is backed up or updated, respectively.

13. The machine-readable media according to claim 12, wherein said fresh data indications comprise change marks.

* * * * *

UNITED STATES PATENT AND TRADEMARK OFFICE
CERTIFICATE OF CORRECTION

| | |
|---|---|
| PATENT NO. | : 7,266,574 B1 |
| APPLICATION NO. | : 10/032075 |
| DATED | : September 4, 2007 |
| INVENTOR(S) | : Robert A. Boudrie et al. |

It is certified that error appears in the above-identified patent and that said Letters Patent is hereby corrected as shown below:

Col. 2, line 3, delete ", the" and replace with -- , they --.

Col. 2, line 27, delete "due false" and replace with -- due to false --.

Col. 2, line 32, delete "it's" and replace with -- its --.

Figure 3:
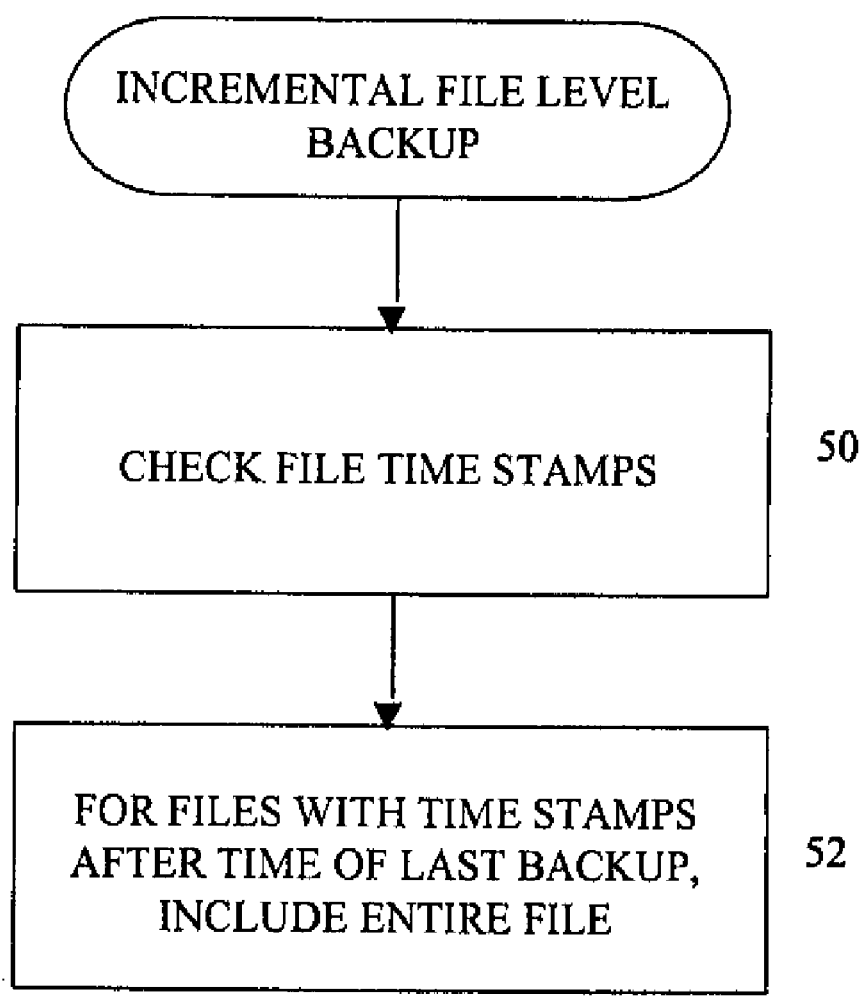
FIG. 3 is flow chart of an incremental file level backup process, in accordance with one background art approach.

Col. 3, line 33, delete "FIG. 3 is flow" and replace with -- FIG. 3 is a flow --.

Col. 4, line 41, delete ", the" and replace with -- , they--.

Col. 4, line 60, delete "it's" and replace with -- its--.

Signed and Sealed this

Twenty-seventh Day of November, 2007

JON W. DUDAS
*Director of the United States Patent and Trademark Office*